Dec. 4, 1923. 1,476,569
T. ZWEIGBERGK
ELECTRIC MOTOR CONTROL SYSTEM
Filed Dec. 29, 1919
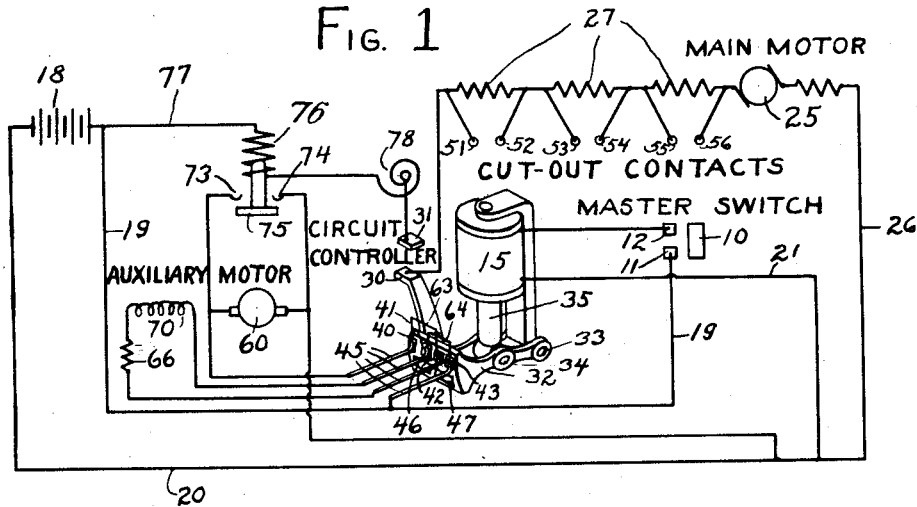
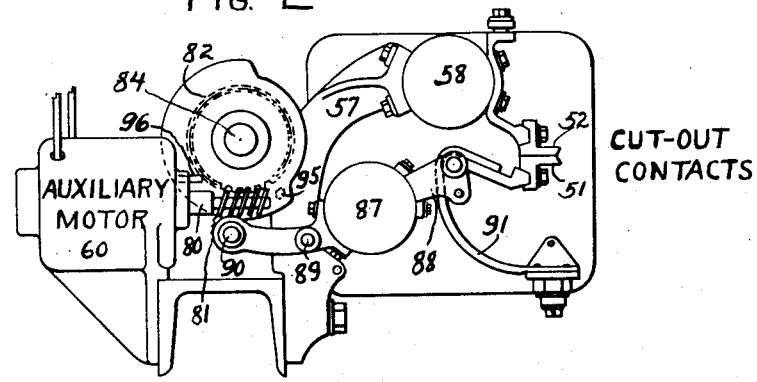
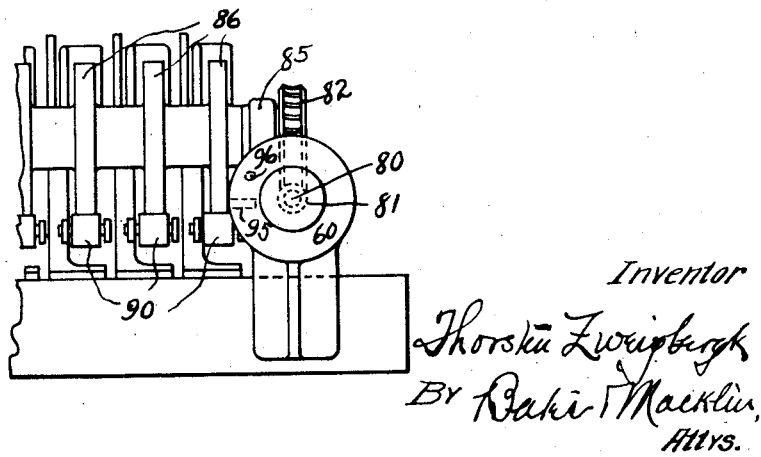
Inventor
Thorsten Zweigbergk
By Baker Macklin
Attys.

Patented Dec. 4, 1923.

1,476,569

UNITED STATES PATENT OFFICE.

THORSTEN ZWEIGBERGK, OF LONDON, ENGLAND.

ELECTRIC-MOTOR-CONTROL SYSTEM.

Application filed December 29, 1919. Serial No. 347,922.

*To all whom it may concern:*

Be it known that I, THORSTEN ZWEIGBERGK, a citizen of the United States, residing at London, in the county of London, England, have invented a certain new and useful Improvement in Electric-Motor-Control Systems, of which the following is a full, clear, and exact description, reference being had to the accompanying drawings.

This invention relates to electric motor control systems where starting resistances are automatically cut out in succession when the master switch is operated.

The invention includes the provision of a system wherein starting resistances in the circuit of a main motor are successively cut out by the operation of an auxiliary motor and without interruption of the main motor circuit, which latter is closed at only one switch contact. In accomplishing my object, I employ an auxiliary motor in constant circuit with a suitable source of energy and with a reversing switch. Combined with the reversing switch is a main switch in circuit with the source, the motor to be controlled and the series of starting resistances. Operation of a master switch actuates a solenoid, the cord of which is connected to the movable member of the main switch and to the movable contacts of the reversing switch. Reversal of the constantly energized auxiliary motor causes movement of the resistance-controlling contacts, whereby the resistance in the main circuit is gradually varied.

There is also preferably provided a maximum current relay, operative in response to the main current and arranged to short-circuit the armature of the auxiliary motor when the main current reaches any desired maximum, and to remove this short circuit when the current has fallen below such maximum. The armature of the auxiliary motor is arranged to act mechanically on the set of short-circuiting contacts for the successive resistances in series with the main motor, and upon closing the master switch is thus adapted to successively cut out these resistances.

Other features and objects of the invention will be apparent as the description proceeds. The invention is illustrated in the accompanying drawings, and the essential characteristics are summarized in the claims.

In the drawings, Fig. 1 is a diagrammatic view, with parts in perspective, of the general arrangement of the system; Fig. 2 is an end elevation of the auxiliary motor and associated parts including the resistance cut-out contacts. Fig. 3 is a side elevation of parts shown in Fig. 2.

Referring to the drawings by numerals, 10 designates the master-switch including fixed contacts 11 and 12. The contact 12 is connected with one end of the coil of the solenoid 15. One pole of a source of energy, 18, is connected by a wire 19 with the contact 11, and the other pole by wires 20 and 21 with the other end of the solenoid coil.

The main motor, 25, that is, the motor to be started, has one terminal connected by wires 26 and 20 with the source 18, and the other terminal, connected thru a series of resistances 27 and cut-out switches 51, 52, 53, 54, 55, 56, with one contact 30 of a circuit closer, whose other contact 31 is connected with the source 18. The contact 30 of the circuit closer is preferably movable, and is carried by an arm secured to a lever 32 pivoted at 33 to the frame of the solenoid. The lever 32 has a series of contact plates, 40, 41, 42 and 43 engaged by fixed contact arms 45 (forming terminals of the auxiliary motor) when the contact 30 is in open position, and another set of contacts 46 and 47 engaged by the arms 45 when the contact 30 is in closed position, the whole constituting a reversing switch.

The resistances 27 have their ends connected to contacts shown at 51, 52, 53, 54, 55 and 56, which are alternately fixed and movable, and these contacts are controlled as hereinafter described by an auxiliary motor 60. The armature of the motor 60 has one terminal 61 connected to one of the contact arms 45 constituting the stationary arms of the reversing switch. This contact arm, when the parts are in the position shown in Fig. 1, with the switch 30, 31 open, is connected thru a wire 63 with a second arm 45, which is connected through a resistance 66, with the field 70 of the motor. The other end of the field 70 is connected to another arm 45 and through a wire 64 with a fourth arm 45, which in turn is connected to the wire 19 leading to the source 18. The arms 45 may contact with the wires 63 and 64 through the four plates 40, 41, 42 and 43, as illustrated in Fig. 1. When the switch 30, 31 is closed by operation of the master switch 10 and consequent energization of the solenoid 15, the arms 45 contact with plates 46 and 47, each of which are adapted to receive two adjacent arms 45.

The terminals 61 and 62 of the armature of the motor 60 are further connected to contacts 73 and 74, which lie in the path of the movable plunger 75 controlled by a solenoid coil 76, connected by a wire 77 with the source 18. The other end of the coil is connected through a blow out coil 78 with the fixed contact 31 of the main switch for controlling contacts 51 ... 56.

The shaft 80 of the armature of the motor 60 is provided with a worm 81 which meshes with a worm wheel 82 carried by a shaft 84 mounted in suitable bearings such as 85. Fixed to the shaft 84, and at different angular positions thereon respectively, is a series of spaced cams 86. In Fig. 2 the resistance controlling contacts 51 and 52 are shown, 52 being fixed on an insulating block 58 carried by a stationary arm 57, and 51 being carried by a rocking arm 88 having an interposed insulation 87 and pivoted intermediately at 89 and carrying on its other end a roller 90, which is spring-pressed as by the spring 91 against a cam 86. The shaft 84 is provided with stops, which may have any convenient location but are illustrated by the pins 95 and 96 carried by the endmost cam and the motor frame, respectively, which limit the angular movement of the shaft and cams in either direction.

In operation, when the master switch 10 is closed, the current flows from the source 18 through the master switch and the solenoid 15 back to the source. The consequent energization of the solenoid, causes the plunger 35 to rise, thereby moving the circuit closer 30, 31 to close the circuit of the main motor 25 through resistances 27. The auxiliary motor 60, which is always in circuit through one of the sets of contacts on the lever 32 of the reversing switch and is normally held against movement by the engagement of its stops, has its direction of rotation reversed and hence its movement started by the operation of the circuit controller 30, 31. With the switch 30, 31 open, the shaft 84 is in such position against the fixed stop that the rollers 90 engage the lower portions of all of the cams 86, so that the contacts 51 ... 56 are all open and the resistances 27, therefore, in circuit with the main motor 25. Upon closing the switch 30, 31 as described, the contact plates 40, 41, 42 and 43 are moved out of engagement with the contact arms 45 and the contact plates 46 and 47 engage said arms 45, thereby reversing the direction of current through the field 70 and consequently reversing the auxiliary motor which then normally runs until it engages the fixed stop at the other end of its movement. This reversal of the motor shaft 84 brings the high portions of the cams 86 into contact with the rollers 90, so that the pairs of contacts 51 and 52, 53 and 54, 55 and 56 are closed successively. Thus the resistances 27 between the switch 30, 31 and the main motor 25 are finally all cut out.

The solenoid 76 with its plunger 75 constitutes a safety device to prevent cutting out the resistance too quickly when starting. If there should be too heavy a rush of current, due to the motor 25 being thus overloaded, the consequent energization of the solenoid 76 short circuits the armature of the auxiliary motor and thus halts the cutting out of resistance.

The motor 60 will run continuously (or if with an abnormally heavy load, intermittently, as just described) until the stops 95, 96 limit its rotation in the new direction after the contacts 51 ... 56 have been closed and the resistances 27 all cut out. Then, although the circuit thru this motor is still closed, its armature is mechanically prevented from further rotation.

When the master switch 10 is opened the reverse order of action takes place; the field of the auxiliary motor 60 being again reversed and the cams 86 rotated to bring their low portions into engagement with rollers 90, thereby breaking contacts 51 ... 56 and putting resistances 27 again in circuit with the main motor for the next operation.

As will be noted the operation of the master switch 10 opens the single circuit controller 30, 31, which is the only point in the circuit of the motor where a break occurs.

I claim:

1. In a system of the class described, the combination of a motor in an open circuit, a variable resistance therein, an auxiliary motor, an electromagnetic switch for reversing the same, means for closing the main circuit and simultaneously actuating said switch to reverse the auxiliary motor in a different circuit, and means whereby such reversal successively varies the resistance in the main circuit.

2. In a system of the class described, the combination of a motor in an open circuit, a variable resistance therein, an auxiliary motor, an electromagnetic switch adapted to close the main circuit and reverse the auxiliary motor, and means whereby such reversal of the auxiliary motor successively short-circuits the resistance in said main circuit.

3. In combination, a motor having a plurality of resistances and a circuit closer in series therewith, a reversing switch, a solenoid for actuating said reversing switch and simultaneously closing said circuit closer, an auxiliary motor in a second circuit, and and means for cutting out said resistances when the auxiliary motor is reversed by actuation of said reversing switch.

4. The combination with a main motor and resistances in circuit therewith, an auxiliary motor continuously energized as to both its field and armature, mechanism operated thereby for successively cutting out said resistances, means for limiting the movement of the motor in either direction, an electromagnetic device for reversing the direction of rotation of the motor, and a master switch for controlling said electromagnetic device, and connections whereby said electro-magnetic device immediately closes the main motor circuit, regardless of the resistances in said circuit.

5. In a system of the class described, the combination of a motor in an open main circuit, a variable resistance therein, a motor in an auxiliary circuit, a solenoid, a reversing switch and a circuit controller both operated by the armature of said solenoid, means whereby such operation reverses said auxiliary motor and opens or closes the circuit to the main motor, and means associated with said auxiliary motor for varying the resistance in the main circuit.

6. The combination of a motor in an open main circuit, a variable resistance therein, a second motor in an auxiliary circuit, an electromagnetic switch for simultaneously closing said main circuit and reversing said auxiliary motor whereby the resistance in said main circuit is successively varied, and means for preventing premature removal of resistance from said main circuit.

7. The combination of a motor in an open main circuit, a variable resistance therein, a second motor in a constantly closed auxiliary circuit, said auxiliary motor having its shaft mechanically prevented from rotation beyond predetermined limits, means for simultaneously closing said main circuit and reversing the motor in said auxiliary circuit whereby the shaft of said motor makes its predetermined movement and successively varies the resistance in said main circuit.

8. The combination of means for varying the resistance of a motor when starting the same, comprising a solenoid, a circuit closer connected with the core of the solenoid, means for energizing the solenoid, a continuously energized auxiliary motor, means for limiting its rotation, means actuated by the solenoid for reversing said auxiliary motor, and means adapted to cut out resistance operated by said auxiliary motor whereby its reversal may cause the gradual cutting out of the resistance in said main circuit.

9. In a system of the class described, the combination of a motor in an open main circuit, a variable resistance therein, a solenoid adapted to be actuated, a member pivoted to said solenoid having an arm adapted to close said circuit when the solenoid is energized, said member also having two sets of contact plates, a motor in an auxiliary circuit, means whereby said auxiliary circuit is constantly closed through one or the other of said sets of contact plates, said plates being connected whereby shifting of the member by actuation of the solenoid reverses said auxiliary motor, and means associated with said auxiliary motor for varying the resistance in the main circuit.

10. In a system of the class described, the combination of a motor in an open main circuit, a variable resistance therein, a closed auxiliary circuit having a motor therein, means for controlling said main circuit at a single point and for simultaneously reversing the direction of rotation of the armature shaft of the auxiliary motor, a plurality of short circuiting contacts for the resistances in the main circuit, a cam shaft driven by said auxiliary motor, cams on said shaft engaging said switches in timed relation, whereby said contacts are successively operated to vary the resistance in the main circuit upon controlling said circuit at said single point.

11. The combination of a motor in a main circuit, a variable resistance therein, a second motor in a constantly closed auxiliary circuit, the armature shaft of said auxiliary motor having limited rotative movement, cams driven by said shaft, cut-out resistance switch levers in engagement with said cams, and means for closing said main circuit and reversing the motor in said auxiliary circuit, whereby the shaft of said motor moves a predetermined distance in the opposite direction and successively cuts out the resistances in said main circuit.

12. The combination of a motor, a plurality of cams driven by the motor and adapted to act successively, a plurality of switches opened and closed by the cams, each switch comprising a stationary contact supporting member and a movable contact supporting member arranged to close the contacts whereby resistance in a separate circuit may be cut out or cut in step by step, a relay switch in series with the resistance circuit for arresting movement of the motor at a predetermined condition of the resistance circuit, and means for arresting the movement of the cams at predetermined points in the rotation thereof, said means being independent of the motor circuit.

13. The combination of a motor, a shaft, a plurality of cams mounted on the shaft, reduction gearing connecting the motor to the shaft, a plurality of switches comprising stationary contact supporting members and movable contact supporting members, the movable contact supporting members being adapted to be successively actuated by the cams, whereby resistance in a circuit independent of the motor circuit may be cut out step by step by a quick closing movement of the contacts, and mechanical means independent of the motor for arresting the movement of the shaft within predetermined limits.

14. The combination of a main motor, an auxiliary motor, a shaft, a worm gear drive between the auxiliary motor and the shaft, a plurality of cams mounted upon the shaft, each cam having a rise angularly spaced with relation to the rise on an adjacent cam, a plurality of lever members provided with switch contacts and adapted to be successively acted upon by the cams, a series of resistances in the main motor circuit, a series of stationary contacts connected in shunt relation to such resistances, whereby actuation of the levers will successively close shunt circuits around the resistances in the main motor circuit, and mechanical means for limiting rotation of the cam shaft when all of said switch levers have been successively actuated by the cams.

15. The combination of a motor, reduction gearing therefor, means including a shaft driven in both directions by the motor within predetermined limits, a series of cams driven by the shaft and adapted to successively actuate a series of switches, whereby resistance in a separate circuit may be cut out step by step, and a relay switch controlling the circuit of the motor to arrest the movement of the same intermediate said predetermined limits.

THORSTEN ZWEIGBERGK.